(12) United States Patent
Hata et al.

(10) Patent No.: US 9,849,874 B2
(45) Date of Patent: Dec. 26, 2017

(54) CONTROL SYSTEM FOR HYBRID VEHICLE (71) Applicant: TOYOTA JIDOSHA KABUSHIKI KAISHA, Toyota-shi (JP)

(72) Inventors: Kensei Hata, Susono (JP); Makoto Funahashi, Gotemba (JP); Yuji Iwase, Mishima (JP); Yosuke Suzuki, Susono (JP); Hirotatsu Kitabatake, Susono (JP); Seitaro Nobuyasu, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 64 days.

(21) Appl. No.: 14/906,221

(22) PCT Filed: Jul. 15, 2014

(86) PCT No.: PCT/IB2014/001321
§ 371 (c)(1),
(2) Date: Jan. 19, 2016

(87) PCT Pub. No.: WO2015/008132
PCT Pub. Date: Jan. 22, 2015

(65) Prior Publication Data
US 2016/0159343 A1 Jun. 9, 2016

(30) Foreign Application Priority Data
Jul. 19, 2013 (JP) ................................. 2013-150157

(51) Int. Cl.
*B60K 6/365* (2007.10)
*B60W 10/02* (2006.01)
(Continued)

(52) U.S. Cl.
CPC ............... *B60W 20/40* (2013.01); *B60K 6/26* (2013.01); *B60K 6/38* (2013.01); *B60K 6/387* (2013.01);
(Continued)

(58) Field of Classification Search
CPC .............................. B60K 6/365; B60W 10/02
See application file for complete search history.

(56) References Cited

U.S. PATENT DOCUMENTS

| 5,788,006 A | 8/1998 | Yamaguchi |
| 6,655,485 B1 | 12/2003 | Ito et al. |

(Continued)

FOREIGN PATENT DOCUMENTS

| EP | 2 896 542 A1 | 7/2015 |
| JP | 8-295140 A | 11/1996 |

(Continued)

OTHER PUBLICATIONS

International Search Report dated Dec. 19, 2014, in PCT/IB2014/001321 filed Jul. 15, 2014.

*Primary Examiner* — Tisha Lewis
(74) *Attorney, Agent, or Firm* — Oblon, McClelland, Maier & Neustadt, L.L.P.

(57) ABSTRACT

A control system of a hybrid vehicle, in which a driving power source for travel includes an engine that is started by cranking, a motor that can control a torque, and a clutch that is coupled with the motor and in which a transmission torque capacity continuously changes depending on a change of a control amount is configured to estimate a torque of the clutch based on the torque that the motor outputs, and change rates of the rotational speed of the motor and the clutch caused by changing the control amount, when the torque that the motor outputs is transmitted by the clutch that is in a slip state by changing the control amount.

8 Claims, 5 Drawing Sheets (51) Int. Cl.
*B60W 20/40* (2016.01)
*B60W 10/08* (2006.01)
*F16D 48/06* (2006.01)
*B60K 6/387* (2007.10)
*B60K 6/445* (2007.10)
*B60W 10/06* (2006.01)
*B60K 6/26* (2007.10)
*B60K 6/38* (2007.10)
*B60K 6/442* (2007.10)

(52) U.S. Cl.
CPC .............. *B60K 6/442* (2013.01); *B60K 6/445* (2013.01); *B60W 10/02* (2013.01); *B60W 10/06* (2013.01); *B60W 10/08* (2013.01); *F16D 48/06* (2013.01); *B60K 2006/268* (2013.01); *B60W 2510/0241* (2013.01); *B60W 2510/0275* (2013.01); *B60W 2510/0638* (2013.01); *B60W 2510/0652* (2013.01); *B60W 2510/082* (2013.01); *B60W 2510/083* (2013.01); *B60W 2510/12* (2013.01); *B60W 2710/027* (2013.01); *B60W 2710/0661* (2013.01); *B60W 2710/082* (2013.01); *B60Y 2200/92* (2013.01); *B60Y 2300/182* (2013.01); *B60Y 2300/188* (2013.01); *B60Y 2300/42* (2013.01); *B60Y 2300/43* (2013.01); *B60Y 2300/45* (2013.01); *B60Y 2300/60* (2013.01); *B60Y 2400/424* (2013.01); *F16D 2500/1066* (2013.01); *F16D 2500/3065* (2013.01); *F16D 2500/3068* (2013.01); *F16D 2500/30406* (2013.01); *F16D 2500/30428* (2013.01); *F16D 2500/50236* (2013.01); *F16D 2500/50239* (2013.01); *F16D 2500/50293* (2013.01); *F16D 2500/7044* (2013.01); *Y02T 10/6239* (2013.01); *Y02T 10/6286* (2013.01); *Y10S 903/912* (2013.01); *Y10S 903/93* (2013.01)

(56) References Cited

U.S. PATENT DOCUMENTS

| | | | |
|---|---|---|---|
| 2005/0233858 A1* | 10/2005 | Smith | .................... F16D 48/06 477/175 |
| 2006/0196711 A1 | 9/2006 | Endo | |
| 2012/0245774 A1 | 9/2012 | Takami et al. | |
| 2016/0025160 A1* | 1/2016 | Kim | ..................... F16D 48/066 701/67 |
| 2016/0257300 A1* | 9/2016 | Hata | ..................... B60W 10/06 |
| 2017/0101101 A1* | 4/2017 | Cho | ................ B60W 30/18127 |

FOREIGN PATENT DOCUMENTS

| | | |
|---|---|---|
| JP | 2001-112118 A | 4/2001 |
| JP | 2005-273761 A | 10/2005 |
| JP | 2010-215097 A | 9/2010 |
| JP | 2012-183897 A | 9/2012 |
| JP | 2012-201255 A | 10/2012 |
| JP | 2013-132926 A | 7/2013 |
| JP | 2014-54862 A | 3/2014 |

* cited by examiner

| TRAVEL MODE | K0 CLUTCH<br>ENGAGEMENT: ○<br>RELEASE: — |
|---|---|
| DISCONNECTION EV | — |
| NORMAL EV | ○ |
| HV MODE | ○ |

CONTROL SYSTEM FOR HYBRID VEHICLE

BACKGROUND OF THE INVENTION

1. Field of the Invention

The present invention relates to a control device for a hybrid vehicle that includes an engine and a motor or a motor generator as a driving power source, in particular, a control system for a hybrid vehicle that is configured such that the engine can be disconnected from a transmission system of a driving force.

2. Description of Related Art

A hybrid vehicle that includes both a motor or a motor generator (hereinafter, these are described in block as a motor in some cases) and an engine as a power source has various advantages such that the engine can be stopped (idle stopped) during stoppage, energy can be regenerated by the motor during deceleration, further the engine can be operated at an operation point excellent in the energy efficiency. In particular, when a motor travel time is lengthened, an improvement effect in fuel consumption as a whole vehicle can be increased. This is because, in the case of motor travel, the engine is stopped and a fuel in not consumed. In this case, in order to reduce power loss due to co-rotation of the engine, it is preferable to disconnect the engine from a motor that outputs a driving force for travelling or a power transmission system that transmits the driving force to a wheel. When such a clutch for separating the engine is provided, in the case of motor travel, operation modes such that the engine is stopped or left to travel can be selected. Such a hybrid vehicle provided with a clutch for separating the engine is disclosed in Japanese Patent Application Publication No. 08-295140 (JP 08-295140 A).

According to a simple description of a configuration thereof, in a differential mechanism provided with three rotating elements like a planetary gear system, an electric machine is coupled with a first rotating element, a second rotating element is set as an output element, further a third rotating element is coupled with a braking means. The engine is coupled with the third rotating element via the clutch. Further, the motor is coupled with the second rotating element. Therefore, according to a configuration described in JP 08-295140 A, by fixing the third rotating element by the engine or the braking means, the differential mechanism functions as decelerator or an accelerator. Therefore, by operating the electric machine coupled with the first rotating element as a motor, a torque thereof can be transmitted to an output element. That is, travel by power output from the electric machine and the motor becomes possible. Further, when one-way clutch that engages with the third rotating element when the torque works in a direction that reverses the rotation of the third rotating element and fixes the third rotating element is adopted as the braking means, without relying on the engine during motor travel, the third rotating element can be fixed by the one-way clutch, and further the clutch can be disconnected from the third rotating element, therefore, the engine can be kept driving or be stopped.

Further, Japanese Patent Application Publication No. 2010-215097 (JP 2010-215097 A) discloses a hybrid vehicle that includes a motor that generates a driving force and an engine that is coupled with the motor via a clutch. According to the vehicle described in JP 2010-215097 A, a motor rotational speed and a target clutch torque are set such that a clutch becomes a predetermined slip state, after the target slip state is reached, the target clutch torque is corrected based on a difference between the target clutch torque and a motor torque. More specifically, a rotational speed of the motor is set to the rotational speed for starting the engine, and a target torque of the clutch is set to a torque to be a predetermined slip state. In this state, the target clutch torque is corrected such that a deviation between the motor rotational speed and the engine speed becomes a predetermined value or less. Then, a difference between a motor torque memorized in the course of such control and a torque that is set before start of the control is memorized and, in the control of next time and thereafter, the difference is added to the setting value and the setting value is corrected.

Further, Japanese Patent Application Publication No. 2005-273761 (JP 2005-273761 A) discloses a control device of a hybrid drive device configured such that an engine speed and a first motor generator are coupled via a differential mechanism, an output shaft coupled with an output element of the differential mechanism and a second motor generator are coupled via a transmission mechanism that can perform two-stage speed change, the first motor generator is functioned as an electric machine and the engine speed is controlled to the speed excellent in the fuel consumption, and an electric power generated accompanying this is supplied to the second motor generator, and this is functioned as a motor. Then, the control device described in JP 2005-273761 A is configured to learn a relationship between a torque capacity and an engagement control amount of a frictional engagement device that is provided to the transmission mechanism based on the torque and oil pressure of the clutch for maintaining the rotational speed of the second motor generator at a predetermined value.

Next, Japanese Patent Application Publication No. 2001-112118 (JP 2001-112118 A) discloses a hybrid drive device that includes a brake that couples an engine and a motor via a power dividing mechanism made of a differential mechanism and fixes an output element of the power dividing mechanism, a first clutch that couples the motor with an input shaft of a transmission, and a second clutch that couples the output element with the input shaft of the transmission. According to the device described in this JP 2001-112118 A, an input torque of the transmission in the process of gradually increasing oil pressure of the second clutch is estimated based on the motor torque and a transmission torque capacity of the second clutch.

SUMMARY OF THE INVENTION

When the clutch is disposed between the engine and the motor as described in JP 08-295140 A, various operation states can be set. However, if the torque or the rotational speed is different between both sides that sandwich the clutch, when the clutch is engaged or released, the torque of the clutch does not necessarily become an intended torque, therefore, a torque fluctuation or a shock caused thereby may be generated, or NV characteristics (characteristics of noise and vibration) may be degraded.

On the other hand, in the device described in JP 2010-215097 A, since the target clutch torque is corrected, the torque when engaging or releasing the clutch can be suppressed from fluctuating. However, the configuration described in JP 2010-215097 A is a configuration in which the target clutch torque is corrected by maintaining the motor rotational speed at a rotational speed that sets the predetermined slip state, on the other hand, when the clutch is engaged or released, for example, in a state where the vehicle is travelling, since the rotational speed of the motor fluctuates, the torque associated with such rotational speed fluctuation is not considered. Therefore, an error is generated in the control of the clutch torque, this causes a shock or an unpleasant sensation, or the NV characteristics may be degraded. Since the device described in JP 2005-273761 A learns, in the same manner as the device described in JP 2010-215097 A, a relationship between the motor torque and the amount of clutch control in a state where the rotational speed is maintained, there is a problem the same as that in the device described in JP 2010-215097 A.

Next, the device described in JP 2001-112118 A is a device configured to estimate the torque that is input to the transmission from the power dividing mechanism with the frictional engagement device, and the torque is estimated based on the motor torque and the torque capacity of the clutch. However, when the torque capacity of the clutch cannot be detected or estimated, as a result, the input torque cannot accurately be estimated.

The present invention provides a control system that can evade or suppress a shock or an unpleasant sensation when an engine is started by accurately estimating a torque of a clutch when a motor and an engine, which are contained in a driving power source of a hybrid vehicle, are coupled or the coupling thereof is released by the clutch.

A first aspect of the present invention relates to a control system for a hybrid vehicle. The control system includes a driving power source and an electronic control unit. The driving power source drives the hybrid vehicle. The driving power source includes a motor, an engine, and a clutch. The motor is configured to output a torque. The engine is configured to be cranked by the motor for starting. The clutch is coupled with the motor. The clutch is configured such that a torque capacity of the clutch continuously changes depending on a change of a control amount. The electronic control unit is configured to estimate the torque of the clutch based on the torque that the motor outputs, a change rate of the rotational speed of the motor based on the fluctuation of the control amount, and a change rate of the rotational speed of a member on the motor side of the clutch based on the fluctuation of the control amount, when the torque that the motor outputs by the clutch in a slip state by changing the control amount is transmitted to the engine.

A second aspect of the present invention relates to a control system for a hybrid vehicle. The control system includes a driving power source and an electronic control unit. The driving power source drives the hybrid vehicle. The driving power source includes a motor, an engine, and a clutch. The motor is configured to output a torque. The engine is configured to be cranked by the motor for starting. The engine and the motor are coupled via the clutch, and the clutch is configured such that a torque capacity of the clutch continuously changes depending on a change of a control amount. The electronic control unit is configured to estimate the torque of the clutch based on the torque that the motor outputs, a change rate of the rotational speed of the motor based on an increase in the engine speed, and a change rate of the rotational speed of a member on the motor side of the clutch based on the increase of the engine speed, when the torque is transmitted from the motor to the engine via the clutch in a slip state and the engine is cranked such that the engine speed is increased.

According to the control system described above, the motor may include a first motor that has a power generation function. The control system described above may further include a differential mechanism and a second motor. The differential mechanism may be configured to perform a differential operation with at least a first rotating element, a second rotating element, and a third rotating element. The first motor may be coupled with the first rotating element. The engine may be coupled with the second rotating element. The third rotating element may be configured to transmit a driving force to a wheel. The second motor may be coupled with the third rotating element.

According to the control system described above, the electronic control unit may be configured to estimate a torque of the clutch when the engine is cranked by the first motor such that the engine is started in a state in which the wheel is braked and the rotation of the third rotating element is stopped.

According to the control system described above, the electronic control unit may be configured to make an output of the second motor when performing an estimation of a torque of the clutch an output that satisfies a request output to the hybrid vehicle.

According to the present invention, the clutch torque is estimated in the course of slipping the clutch to change an engagement state thereof, in particular, the clutch torque is estimated based on the motor torque in the course and the change rates of the rotational speeds of the motor and clutch. Therefore, since the estimated value is a torque in which an inertial torque due to fluctuation of the rotational speed is considered, the estimation accuracy of the clutch torque becomes high. As a result, for example, in the course of starting the engine by cranking with the motor, a situation such that the clutch torque fluctuates, accompanying the fluctuation the drive torque fluctuates and shock is generated, or the NV characteristics are degraded can be evaded or suppressed. In particular, at the time of engine start when the cranking is caused by the motor, the clutch torque is estimated in a state where the output is relatively small and an influence of disturbance such as a pulsation of the engine torque is small, therefore, estimation accuracy of the clutch torque can be improved. Further, upon driving with a driving force of the motor, when the clutch between the motor and the engine is released, the clutch can be released as desired, therefore, it can be evaded or suppressed that the driving torque is fluctuated more than expected, accompanying this, the shock or NV characteristics are degraded, and further electric power is unnecessarily consumed.

In particular, when configured to estimate the clutch torque described above in a state where the wheel is braked and the hybrid vehicle is stopped, although a reaction force torque for estimation is applied on the output element, a situation such that the driving torque fluctuates by performing the braking, and accompanying this shock is generated can be suppressed or evaded.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENT

The present invention is a system that relates to a control of a hybrid vehicle that includes an engine and a motor or a motor generator (hereinafter, these are described in block as a motor in some cases) as a driving power source. In this kind of vehicle, in addition to travel by an engine and travel by the engine and motor, such travel that uses only the motor or travel during which energy is regenerated by the motor can be performed, further, during travel by the motor, a driving form such that the engine is stopped, and the engine is restarted can be adopted. In so-called EV travel during which the motor is used as a the driving power source, it is preferable to suppress the power loss due to co-rotation of the engine, further, in the case of the EV travel in which a plurality of motors are provided and any motors thereof are used to travel, it is preferable to reduce the power loss due to the co-rotation of not only the engine but also motors that do not output power. According to such a requirement, in some cases, a clutch that disconnects the engine from a power transmission system that transmits power to a driving wheel is disposed, the present invention is applied to a control system that takes a hybrid vehicle that is provided with this kind of clutch as a target.

Figure 4:
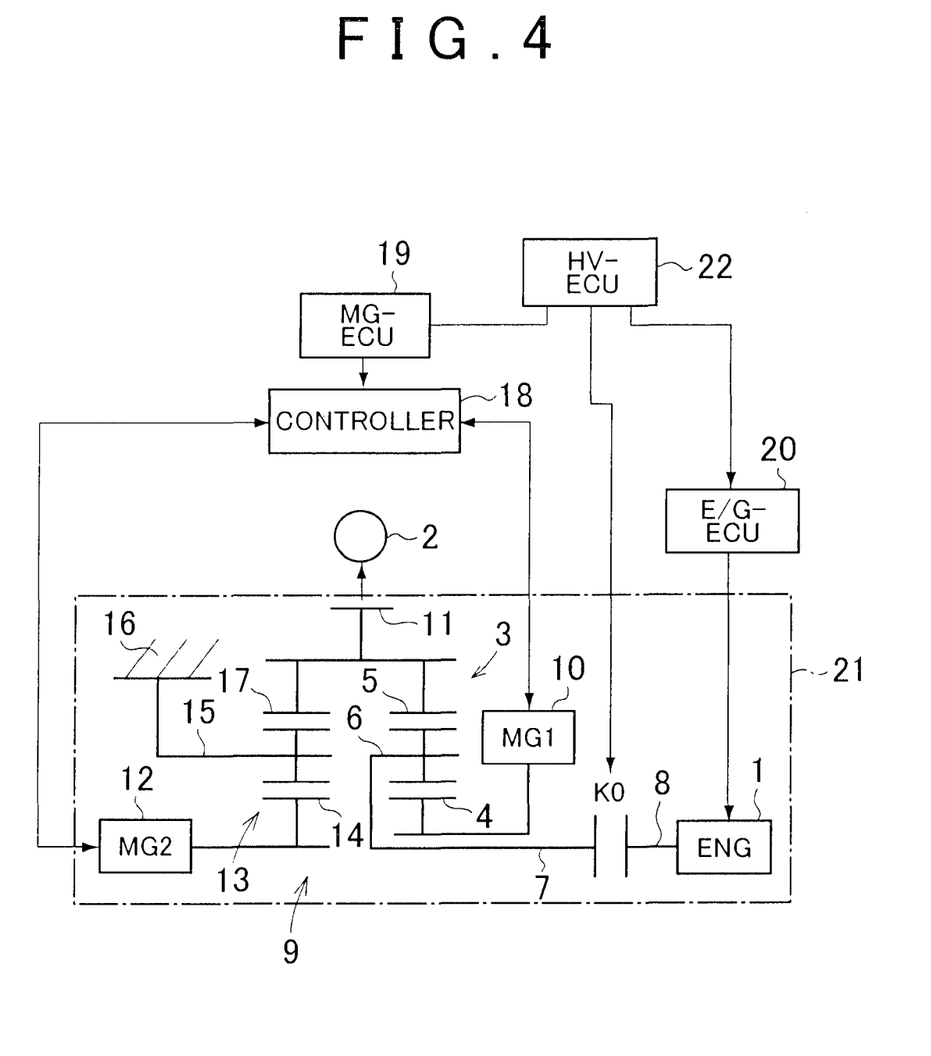
FIG. 4 is a skeleton diagram that shows an example of a gear train of a hybrid vehicle to which the present invention can be applied.

In FIG. 4, an example of a gear train in the hybrid vehicle that includes the above-described clutch is schematically shown. The example shown here is an example configured such that, while a part of power that is output by an engine (ENG) 1 is transmitted to a driving wheel 2 by mechanical means, another part of the power that is output by the engine 1 is, after once converted into electric power, inversely converted to mechanical power and transmitted to the driving wheel 2. A power dividing mechanism 3 that divides the power that the engine 1 outputs like this is disposed. The power dividing mechanism 3 has a configuration the same as that of a power dividing mechanism in a conventional two-motor type hybrid drive device, and, an example shown in FIG. 4 is configured with a differential mechanism that generates a differential operation by three rotating elements, for example, a single pinion type planetary gear mechanism. The single pinion type planetary gear mechanism is configured with a sun gear 4, a ring gear 5 disposed on a concentric circle relative to the sun gear 4, and a carrier 6 that holds such that the pinion gear that is engaged with these sun gear 4 and ring gear 5 can rotate and revolve.

The carrier 6 is an input element and an input shaft 7 is coupled with the carrier 6. Further, between the input shaft 7 and an output shaft (crank shaft) 8 of the engine 1, a clutch K0 is disposed. The clutch K0 couples the engine 1 with a power transmission system 9 such as the power dividing mechanism 3, or disconnects from the power transmission system 9, and is configured by a friction clutch that continuously varies between a state of "0" where a transmission torque capacity is completely released to a complete engagement state of no slip. The friction clutch may be any one of conventional dry and wet clutch, and may be any one of a single plate type and a multi-plate type. Further, an actuator that switches to an engagement state and a release state may be an oil pressure type actuator and an electromagnetic actuator. In the case of, for example, a dry single plate clutch that has been adopted in a conventional vehicle, when the actuator is put into a non-operation state, an engagement state is maintained by a so-called return mechanism such as a diaphragm spring. Therefore, the transmission torque capacity of the clutch K0 varies depending on an amount of operation of an actuator for engaging or releasing the clutch K0 and a correlationship is held between both. More specifically, a nearly proportional relationship exists between an oil pressure or a current value or a stroke amount of the actuator and a transmission torque capacity, therefore, the transmission torque capacity is determined in advance as a value to an amount of operation such as a stroke amount of the actuator or an oil pressure, and can be prepared in a form of a map. When the frictional coefficient varies with time, a relationship between the transmission torque capacity and the amount of operation varies.

Further, the sun gear 4 is a reaction force element and a first motor generator (MG1) 10 is coupled with the sun gear 4. The first motor generator 10 is substantially a motor having a power generating function, and is configured by a permanent magnet synchronous electric machine and the like. Further, the ring gear 5 is an output element, an output gear 11 that is an output member is integrated with the ring gear 5, and a driving force is output from the output gear 11 to the driving wheel 2. A mechanism for transmitting the driving force from the output gear 11 to the driving wheel 2 includes a differential gear or a drive shaft. Since these are the same as the conventional vehicle, detailed description thereof is omitted.

The engine 1, the power dividing mechanism 3 and the first motor generator 10, which are described above are disposed on the same axis line and, on an extension of the axis line, a second motor generator 12 is disposed. The second motor generator 12 generates a driving force for travel and regenerates energy, and is configured by the permanent magnet synchronous electric machine in the same manner as the first motor generator 10. The second motor generator 12 and the output gear 11 are coupled via a deceleration mechanism 13. The deceleration mechanism 13 is, in an example shown in FIG. 4, configured by a single pinion type planetary gear mechanism, the second motor generator 12 is coupled with a sun gear 14, a carrier 15 is coupled with a fixing member 16 such as a housing and fixed, and a ring gear 17 is integrated with the output gear 11.

Each of the motor generators 10 and 12 described above is electrically connected to a controller 18 that includes an electrical storage device and an inverter. An electronic control unit (MG-ECU) 19 for a motor generator for controlling the controller 18 is disposed. The electronic control unit 19 is configured to be mainly formed of a microcomputer, perform a calculation based on input data and memorized data or command signals or the like, and output a result of the calculation to the controller 18 as a control command signal. Each of the motor generators 10 and 12 is configured to function as a motor or an electric machine by a control signal from the controller 18, and a torque in each case is controlled.

The engine 1 described above is configured to electrically control the output and start and stop. In the case of a gasoline engine, for example, a throttle opening degree, a fuel supply amount, stoppage of fuel supply, execution and stoppage of ignition, and ignition timing are configured to be electrically controlled. An electronic control unit (E/G-ECU) 20 for engine for performing the control is disposed. The electronic control unit 20 is configured to be mainly made of a microcomputer, perform a calculation based on input data or command signals, output the result of the calculation to the engine 1 as a control signal, and perform various controls described above.

The engine 1, respective motor generators 10 and 12, the clutch K0 and the power dividing mechanism 3, which were described above constitute a driving power source 21, and an electronic control unit (HV-ECU) 22 for a hybrid, which controls the driving power source 21 is disposed. The electronic control unit 22 is configured to be mainly made of a microcomputer, output a command signal to the electronic control unit 19 for a motor generator or the electronic control unit 20 for an engine, which were described above, and execute various controls described below.

Figure 5:
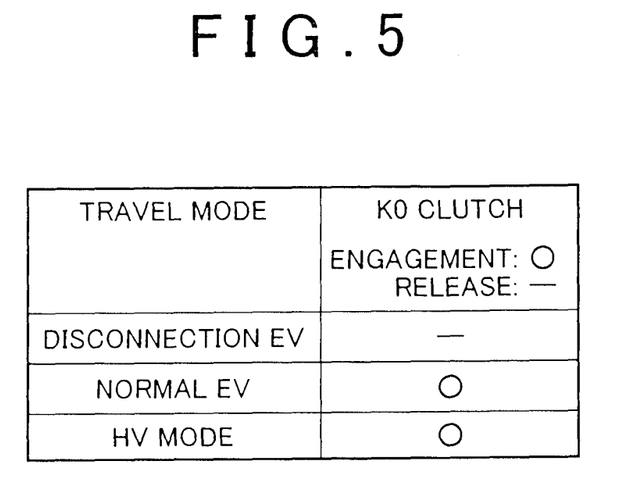
FIG. 5 is a chart that records a state of each travel mode and an engagement and release of a clutch in block.

In a hybrid drive system shown in FIG. 4, a hybrid (HV) mode in which a vehicle travels by power of the engine 1 and an electric vehicle (EV) mode in which the vehicle travels by electric power can be set, further, as the EV mode, a disconnection EV mode in which the engine 1 is disconnected from the power transmission system 9 and a normal EV mode in which the engine 1 and the power transmission system 9 are coupled can be set. Engagement and release states of the clutch K0 described above when these respective modes are set are shown in FIG. 5 in block. That is, in the disconnection EV mode, the clutch K0 is released, by contrast, in the normal EV mode and the HV mode, the clutch K0 is engaged. These travel modes are selected depending on a travel state of the vehicle such as a drive request amount such as an accelerator opening degree, a vehicle speed, and a charged amount of an electrical storage device (SOC: State Of Charge). For example, when a vehicle travels at to some degree a high speed and the accelerator position is to some degree large to maintain the vehicle speed, the HV mode is set. On the other hand, in the case where the SOC is sufficiently large and accelerator position is relatively small, or in the case of a travel state where it is highly likely that an automatically stopped engine 1 is restarted, the normal EV mode is set. Further, in the case, for example, where the EV mode is selected by a driver's manual operation, or the travel is possible only by the electric power, and it is necessary to suppress the power loss by the co-rotation of the first motor generator 10, the disconnection EV mode is selected.

Figure 6:
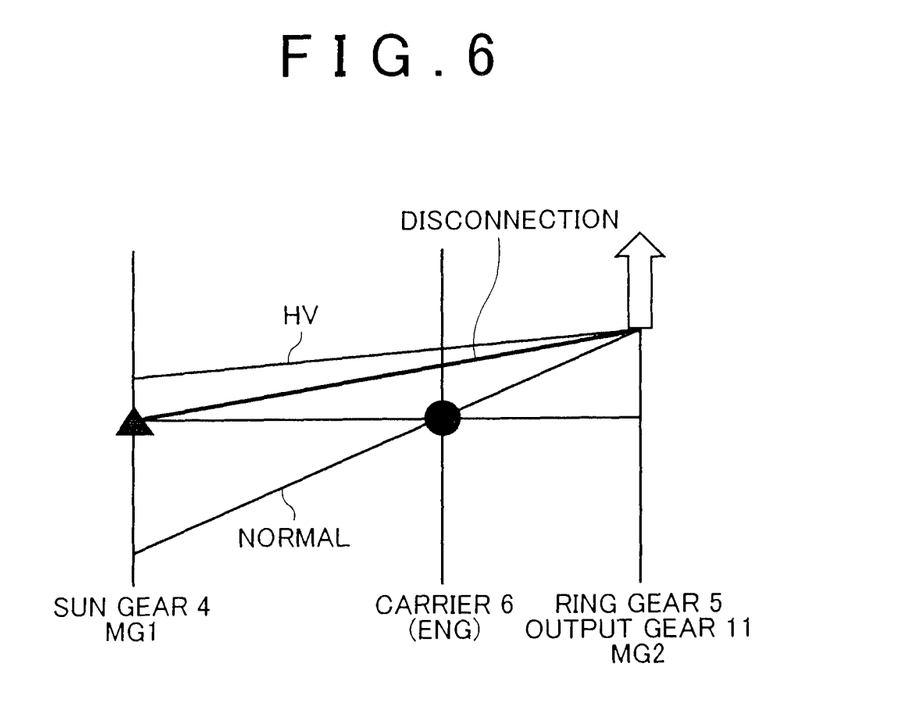
FIG. 6 is a nomograph that describes an operation state in each travel mode.

Here, an operation state of a hybrid drive system in each of the travel modes will be briefly described. FIG. 6 is a nomograph of the power dividing mechanism 3 described above, the nomograph shows each of the sun gear 4, the carrier 6 and the ring gear 5 with a vertical line, separations thereof are set to separations corresponding to a gear ratio of the planetary gear mechanism that forms the power dividing mechanism 3, further, a vertical direction of each of vertical lines is set to a rotation direction and a position in a vertical direction is set to a rotational speed. A line described as "disconnection" in FIG. 6 shows an operation state in the disconnection EV mode, in this travel mode, the second motor generator 12 is functioned as a motor and the vehicle travels by the power thereof, the engine 1 is stopped by disconnecting from the power transmission system 9 by releasing the clutch K0, further, the first motor generator 10 is also stopped. Therefore, the rotation of the sun gear 4 is stopped, the ring gear 5 rotates positively together with the output gear 11 with respect thereto, and the carrier 6 rotates positively at the rotational speed decelerated depending on a gear ratio of the planetary gear mechanism relative to the rotational speed of the ring gear 5.

Further, a line described as "normal" in FIG. 6 shows an operation state in the normal EV mode, in this travel mode, since the vehicle travels by power of the second motor generator 12 and the engine 1 is stopped, in a state where the carrier 6 is fixed, the ring gear 5 rotates positively and the sun gear 4 rotates backwards. In this case, it is also possible to make the first motor generator 10 function as an electric machine. Further, a line described as "HV" in FIG. 6 shows a travel state in the HV mode, since, in a state where the clutch K0 is engaged, the engine 1 outputs a driving force, a torque acts in a direction that positively rotates the carrier 6. In this state, when the first motor generator 10 is functioned as an electric machine, a torque acts on the sun gear 4 in a direction that reverses the rotation. As a result, a torque in a direction that positively rotates the ring gear 5 appears. Further, in this case, electric power generated by the first motor generator 10 is supplied to the second motor generator 12 and the second motor generator 12 functions as a motor, and the driving force is transmitted to the output gear 11. Therefore, in the HV mode, a part of power output from the engine 1 is transmitted to the output gear 11 via the power dividing mechanism 3, and, remaining power is, after conversion into electric power by the first motor generator 10 and transmission to the second motor generator 12, reconverted into mechanical power and transmitted to the output gear 11 from the second motor generator 12. In all travel modes, when there is no need of actively outputting a driving force such as during deceleration, any one of the motor generators 10 and 12 is functioned as an electric machine and energy is regenerated.

As described above, the hybrid vehicle that is a target of the present invention can travel by electric power by releasing the clutch K0, further, in the case where the SOC of the electrical storage device decreases or in the case where the requested driving force increases, the engine 1 is started and its power is transmitted via the clutch K0 to the power transmission system 9. Accompanying switching of the travel modes like this, the clutch K0 is released or engaged, and a torque changes when the clutch is engaged and released. The change of the torque is largely influenced by a change of the transmission torque capacity of the clutch K0. There, the control system according to the present invention is configured to estimate the transmission torque capacity of the clutch K0 (referred to as "clutch torque" in some cases) and to execute the engagement control or the release control of the clutch K0 by making use of the estimation result. This is because the torque transmitted via the clutch K0 is controlled so as to change smoothly and the shock or uncomfortable sensation is evaded or suppressed thereby.

Figure 1:
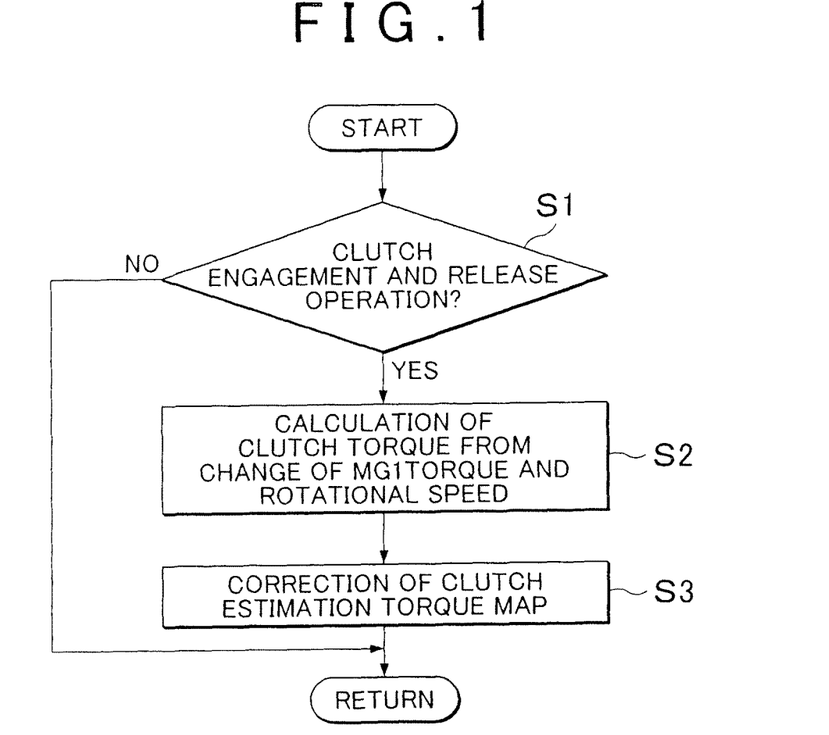
FIG. 1 is a flowchart that describes an example of a control that is executed in a control device according to the present invention.

FIG. 1 is a flowchart for describing an example of an estimation control of the clutch torque, which is executed in the control system according to the present invention. This routine is repeatedly executed when a main switch of a hybrid vehicle is turned on, or executed every time when a predetermined condition is satisfied. The predetermined condition may be properly determined as required, the condition may be that, for example, a main switch is turned on, a predetermined travel distance is reached, a predetermined definite time has elapsed, or the rotation of the driving wheel 2 is stopped by a braking operation and the vehicle is stopped.

In FIG. 1, first, whether an engagement operation of the clutch K0 or a releasing operation thereof is executed is determined (step S1). In the case where because determination of switching the clutch K0 from the released state to the engaged state or on the contrary determination of switching from the engaged state to the released state is not satisfied, the switching operation of the clutch K0 is not executed, negative determination is performed in step S1, in this case, without particularly controlling, the routine of FIG. 1 is once stopped. That is, the routine proceeds to the return. On the contrary, when determination of whether engaging or releasing the clutch K0 is satisfied and the switching operation thereof is started, the positive determination is performed in step S1. Determination of the step S1 can be performed based on a control command signal which the electronic control unit 22 for a hybrid described above outputs to the clutch K0.

Figure 2:
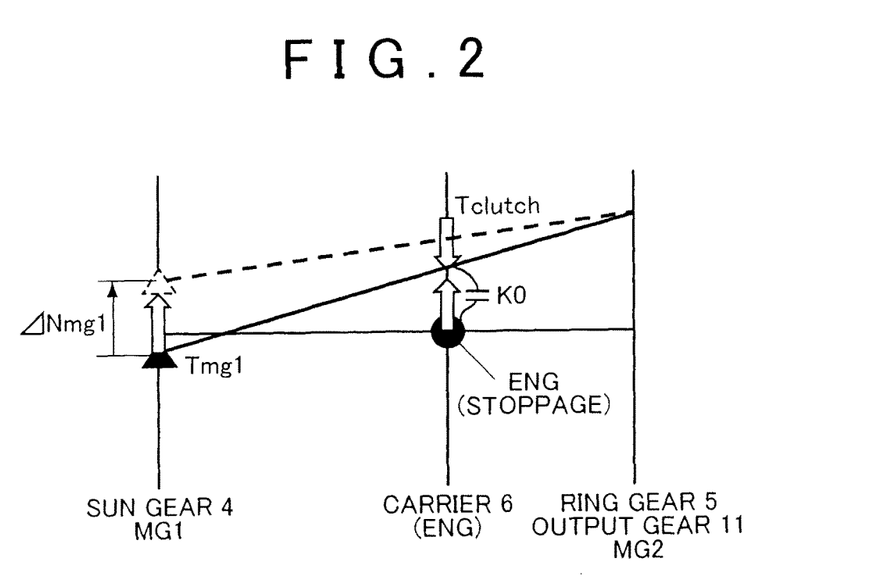
FIG. 2 is a nomograph that shows a state where an engine is cranked by a first motor generator.

When positively determined in the step S1, the clutch torque is calculated (estimated) based on the change of the torque and rotational speed of the first motor generator 10 and the like (step S2). That the clutch K0 is engaged or released in a state where a main switch of the hybrid vehicle is turned on is mainly to start the engine 1 or to stop the engine 1, that is, the first motor generator 10 is controlled such that the speed of the engine 1 may be the target speed. When a case where the engine 1 is started is described as an example thereof, FIG. 2 is a nomograph the same as that in FIG. 6 described above, an example where by stopping the engine 1 and by releasing the clutch K0, the engine 1 is disconnected from the power transmission system 9, in this state, when the vehicle travels by the power of the second motor generator 12, the engine 1 is cranked by the first motor generator 10 is shown.

In a state where the clutch K0 is released, since the torque is not particularly applied to the first motor generator 10, the first motor generator 10 is stopped by, for example, a cogging torque. However, when the clutch K0 begins having the transmission torque capacity, a torque in a direction that reverses the rotation is applied on the first motor generator 10. When the first motor generator 10 outputs a torque in a direction of normal rotation in this state, accompanying the slip of the clutch K0, the rotational speed of the first motor generator 10 changes by a predetermined amount $\Delta Nmg1$. Further, a torque corresponding to the transmission torque capacity of the clutch K0 is applied on the engine 1, and by cranking by the torque, the rotational speed thereof is increased. A torque (clutch torque) Tclutch corresponding to an amount of operation of the clutch K0 at this time is represented by the following formula.

$$Tclutch = Tmg1 \times Gmg1 - Img1 \times \Delta Nmg1 \times Gmg1 - Iclutch \times \Delta Nclutch$$

Herein, Tmg1 represents a torque of the first motor generator 10 and can be obtained from a current value. Img1 represents an inertia moment of the first motor generator 10 and can be obtained in advance. $\Delta Nmg1$ represents a rotational speed change rate (angular acceleration) of the first motor generator 10 and can be obtained based on, for example, the rotational speed detected by a resolver (not shown in the drawing) incorporated in the first motor generator 10. Gmg1 represents a gear ratio between the first motor generator 10 and the clutch K0. Iclutch represents an inertia moment of the clutch K0, which is an inertia moment that includes a member on the first motor generator 10 side in the clutch K0, an input shaft 7 and the carrier 6 that rotate in one body therewith, and $\Delta Nclutch$ represents a rotational speed change rate (angular acceleration) of the clutch K0, which is a rotational speed change rate that includes a member on the first motor generator 10 side in the clutch K0, an input shaft 7 and the carrier 6 that rotate in one body therewith.

When the clutch K0 is engaged or released at a predetermined operation amount that is determined in advance, rotational speeds of the first motor generator 10 and a member on a side of the first motor generator 10 in the clutch K0 change, and torques corresponding to respective inertia moments and the rotational speed change rates are consumed. The torque obtained by subtracting the torque that is consumed in the rotational speed change described above from the output torque of the first motor generator 10 balances with the transmission torque capacity of the clutch K0 that is engaged or released at a predetermined operation amount.

Figure 3:
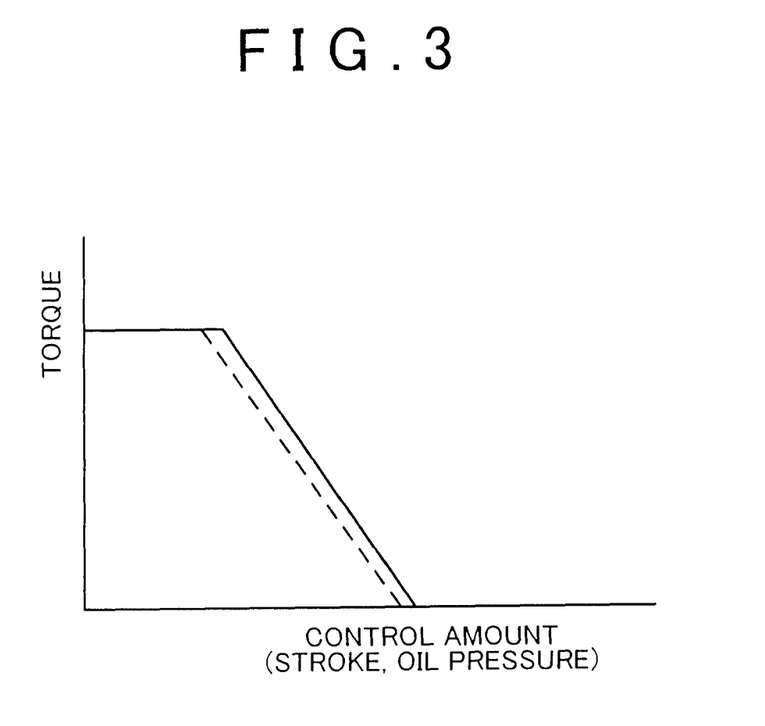
FIG. 3 is a schematic diagram that shows an example of a map in which a relationship between an operation amount of a clutch and a torque is defined.

With the clutch torque Tclutch obtained thus, a map in which the torque is determined corresponding to an operation amount is corrected (step S3), thereafter, the routine proceeds to the return. The map can be represented, as shown in, for example, FIG. 3, as a line map with a control amount (operation amount) such as an operation stroke amount or oil pressure of an actuator in a horizontal axis and a clutch torque in a vertical axis. An example shown in FIG. 3 is a map of a clutch that has the same structure as a dry clutch used in a vehicle on which a manual transmission is mounted. In a state where an operation amount is "0" or equal with or less than a predetermined amount, the clutch is in a so-called complete engagement, and the clutch torque corresponding to the friction coefficient, a diameter of a friction material, and a pressing force by a return spring is maintained. When an operation amount increases to some extent, since the pressing force by the return spring is diminished, the clutch torque gradually decreases to be a half-clutch state where the torque is transmitted accompanying the slip. And, at last, a so-called completely released state is reached, that is, the torque is not transmitted. Since the transmission torque capacity of the friction clutch is determined by the frictional coefficient and a radius of a friction material, the number of friction surfaces and the pressing force (contact pressure of the friction surface) and the like, a map of the friction clutch can be determined in advance. In the step S3 described above, the map prepared in advance is corrected as described above. In FIG. 3, an example of a case when the map is corrected accompanying a decrease in, for example, the frictional coefficient is shown with a broken line.

In the map corrected like this, by taking in a temporal change of errors caused by the frictional coefficient, an elastic force of the return spring, and wear of a mechanism that performs an engagement operation and a releasing operation, a change of the clutch torque relative to an operation amount is corrected. In particular, since the clutch torque Tclutch that corrects data such as the map that determines a relationship between an operation amount of the clutch K0 and the transmission torque capacity includes the torque consumed in the rotational speed change described above during operation by a predetermined operation amount, although this is not the transmission torque capacity of the clutch K0, which is directly detected, it is a torque that is near an actual transmission torque capacity and high in accuracy. That is, according to the control described above of the present invention, the transmission torque capacity of the clutch K0 can be estimated with high accuracy. Therefore, in the case where the clutch K0 is engaged to start the engine 1 in a hybrid vehicle that has the gear train shown in FIG. 4 described above, or in the case where the clutch K0 is released to disconnect the engine 1 from the power transmission system 9, when the clutch K0 is controlled based on the map corrected as described above, by suppressing a rapid change of the torque, the shock or uncomfortable sensation can be prevented or suppressed.

Further, on the other hand, deficiency in the torque and excessive slippage of the clutch K0 caused thereby can be suppressed.

When the determination was negative in the step S1 described above, that is, an operation of engagement or release of the clutch K0 was not performed or is not performed, without particularly performing the control, the routine of FIG. 1 is once stopped. That is, the routine proceeds to the return.

Now, as known from the nomograph shown in FIG. 2, when the engine 1 is cranked by the first motor generator 10 in a state of traveling by power of the second motor generator 12, a torque in a direction that reduces the driving force works on the ring gear 5 that is an output element or the output gear 11 integrated therewith. By increasing the output torque of the second motor generator 12 so as to overcome the torque, the drive torque of the hybrid vehicle can be suppressed from changing. On the other hand, in the hybrid vehicle, when a charging capacity (SOC) of an electrical storage device becomes a predetermined reference capacity or less, the engine 1 drives, for example, the first motor generator 10 to generate power and charges the electrical storage device. Such power generation and charging are preferably performed not so as to influence on the driving force for travel of the hybrid vehicle. For this, in a state in which the driving wheel 2 is braked and the hybrid vehicle is stopped, the engine 1 is started for power generation in some cases. Such an operation is called a "P charge" in some cases, in that case, although a reaction force torque accompanying the start of the engine 1 is applied on the output gear 11, since the vehicle is braked, the shock or vibration is hardly generated. An estimation of the clutch torque or correction of data such as the map based on the result of the estimation according to the present invention are preferably executed when the engine 1 is started by such so-called P charge. This is because other controls accompanying the estimation of the clutch torque can be made less.

Figure 7:
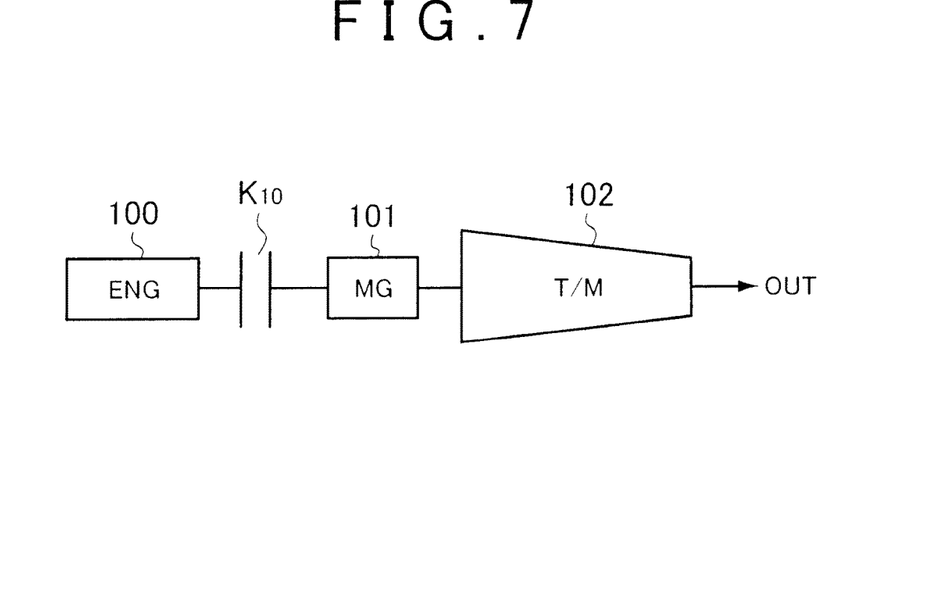
FIG. 7 is a block diagram that shows another example of a power train of a hybrid vehicle to which the present invention can be applied.
Figure 8:
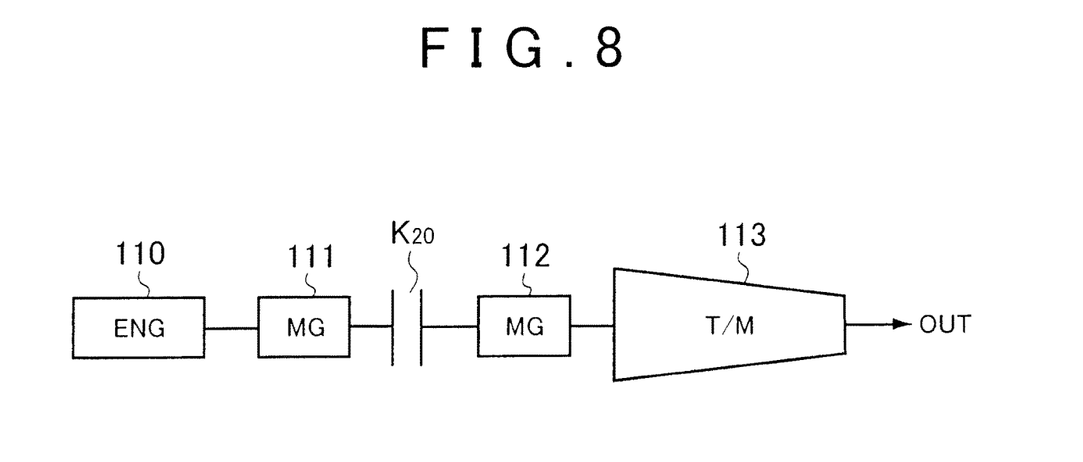
FIG. 8 is a block diagram that shows still another example of a power train of a hybrid vehicle to which the present invention can be applied.

The present invention can be applied to, without limiting to specific examples described above, a device that estimates the transmission torque capacity of the clutch that transmits the torque of the motor in the hybrid vehicle and that corrects the relationship between an operation amount and the torque of the clutch based on the estimation result. With a hybrid vehicle that includes, as shown in, for example, FIG. 7, a power train in which an engine (ENG) 100 and a motor generator 101 are coupled by a clutch K10 and a transmission (T/M) 102 is coupled on an output side of the motor generator (MG) 101 as a target, a clutch torque may be estimated based on the torque of the motor generator 101 or the change rate of the rotational speed thereof when the clutch K10 is engaged or released. Alternatively, with a hybrid vehicle in which, as shown in FIG. 8, a first motor generator (MG) 111 is coupled on an output side of an engine (ENG) 110 and a second motor generator (MG) 112 is coupled with the first motor generator (MG) 111 via a clutch K20, and a transmission (TM) 113 is coupled on an output side of the second motor generator 112 as a target, a clutch torque may be estimated based on a torque of the motor generator 111 (or 112) or the change rate of the rotational speed thereof when the clutch K20 is engaged or released.

The invention claimed is:

1. A control system for a hybrid vehicle, the control system comprising:
a driving power source configured to travel the hybrid vehicle, the driving power source including a motor, an engine, and a clutch, the motor being configured to output a torque, the engine being configured to be cranked by the motor to start, the clutch being coupled with the motor, and the clutch being configured such that a torque capacity of the clutch continuously changes based on a change of a control amount; and
an electronic control unit configured to, when the torque that the motor outputs is transmitted to the engine through the clutch in a slip state by changing the control amount, estimate a torque of the clutch based on the torque that the motor outputs, a change rate of a rotational speed of the motor based on a change of the control amount, and a change rate of a rotational speed of a member on a motor side of the clutch based on the change of the control amount.

2. A control system for a hybrid vehicle, the control system comprising:
a driving power source configured to travel the hybrid vehicle, the driving power source including a motor, an engine, and a clutch, the motor being configured to output a torque, the engine being configured to be cranked by the motor to start, the engine being coupled with the motor via the clutch, and the clutch being configured such that a torque capacity of the clutch continuously changes based on a change of a control amount; and
an electronic control unit configured to, when the torque is transmitted from the motor via the clutch in a slip state to the engine to crank the engine such that an engine speed is increased, estimate a torque of the clutch based on the torque that the motor outputs, a change rate of a rotational speed of the motor based on an increase in the engine speed, and a change rate of a rotational speed of a member on a motor side of the clutch based on the increase in the engine speed.

3. The control system according to claim 1, wherein the motor includes a first motor having a power generation function,
the control system further comprising:
a differential mechanism configured to perform a differential operation by at least a first rotating element, a second rotating element, and a third rotating element; and
a second motor,
wherein the first motor is coupled with the first rotating element;
the engine is coupled with the second rotating element;
the third rotating element is configured to transmit a driving force to a wheel; and
the third rotating element is coupled with the second motor.

4. The control system according to claim 3, wherein the electronic control unit is configured to estimate the torque of the clutch when the engine is cranked by the first motor such that the engine is started in a state in which the wheel is braked and a rotation of the third rotating element is stopped.

5. The control system according to claim 3, wherein the electronic control unit is configured to make an output of the second motor, an output that satisfies a request output to the hybrid vehicle, when the torque of the clutch is estimated.

6. The control system according to claim 2, wherein the motor includes a first motor having a power generation function,
the control system further comprising:

a differential mechanism configured to perform a differential operation by at least a first rotating element, a second rotating element, and a third rotating element; and a second motor, wherein the first motor is coupled with the first rotating element;

the engine is coupled with the second rotating element;

the third rotating element is configured to transmit a driving force to a wheel; and the third rotating element is coupled with the second motor.

7. The control system according to claim 6, wherein the electronic control unit is configured to estimate the torque of the clutch when the engine is cranked by the first motor such that the engine is started in a state in which the wheel is braked and a rotation of the third rotating element is stopped.

8. The control system according to claim 6, wherein the electronic control unit is configured to make an output of the second motor, an output that satisfies a request output to the hybrid vehicle, when the torque of the clutch is estimated.

* * * * *